United States Patent
Assie

(10) Patent No.: US 6,698,095 B1
(45) Date of Patent: Mar. 2, 2004

(54) METHOD FOR MACHINING A CRANKSHAFT WITH ORIGINAL ARRANGEMENT OF THE BALANCING OPERATION AND IMPLEMENTING DEVICE

(75) Inventor: Jean-Paul Assie, Castres (FR)

(73) Assignee: Renault Automation Comau (FR)

( * ) Notice: Subject to any disclaimer, the term of this patent is extended or adjusted under 35 U.S.C. 154(b) by 0 days.

(21) Appl. No.: 09/806,666
(22) PCT Filed: Jul. 26, 2000
(86) PCT No.: PCT/FR00/02141
§ 371 (c)(1), (2), (4) Date: Apr. 2, 2001
(87) PCT Pub. No.: WO01/09528
PCT Pub. Date: Feb. 8, 2001

(30) Foreign Application Priority Data

Aug. 2, 1999 (FR) .............................. 99 10008

(51) Int. Cl.$^7$ ................................. B21K 1/08
(52) U.S. Cl. ...................... 29/888.08; 29/6.01; 29/406; 29/407.05; 29/558
(58) Field of Search ................ 29/888.06, 888.08, 29/6.01, 406, 407.01, 407.04, 407.05, 407.08, 407.09, 557, 558

(56) References Cited

U.S. PATENT DOCUMENTS

| | | | |
|---|---|---|---|
| 2,919,581 A | * | 1/1960 | Lash |
| 4,559,681 A | * | 12/1985 | Coquillart et al. |
| 4,768,397 A | * | 9/1988 | Adams |
| 4,774,746 A | * | 10/1988 | Blaimschein |
| 4,779,316 A | * | 10/1988 | Cherry et al. |
| 4,884,210 A | * | 11/1989 | Blaimschein |
| 5,025,689 A | * | 6/1991 | Mayer |
| 5,131,143 A | * | 7/1992 | Kirchberger |
| 5,408,745 A | * | 4/1995 | Tomiyama et al. |
| 5,435,059 A | * | 7/1995 | Chawla |
| 6,397,463 B1 | * | 6/2002 | Assie |

FOREIGN PATENT DOCUMENTS

| | | | |
|---|---|---|---|
| FR | 2761129 | * | 9/1998 |
| GB | 1313492 | * | 4/1970 |
| GB | 2037941 | * | 7/1980 |
| JP | 58-090344 | * | 5/1983 |
| JP | 64-034615 | * | 2/1989 |
| JP | 01-257502 | * | 10/1989 |
| JP | 02-041730 | * | 2/1990 |
| JP | 04-272543 | * | 9/1992 |
| SU | 1132157 | * | 12/1984 |

* cited by examiner

Primary Examiner—Icuda Rosenbaum
Assistant Examiner—Eric Compton
(74) Attorney, Agent, or Firm—Sughrue Mion, PLLC

(57) ABSTRACT

The invention concerns a method for machining crankshaft comprising the following main operations: determining starting points; machining the ends, bearings and crank pins; producing lubricating oil holes; finishing the ends, bearings and crank pins, dynamic measurement and optionally removing material for balancing purposes. The method is characterized in that it consists in carrying out dynamic mass measurements and eliminating material for balancing purposes, before the finishing operations. The invention also concerns a device for implementing said method. The invention is applicable to production lines machining and balancing crankshafts.

4 Claims, 1 Drawing Sheet

METHOD FOR MACHINING A CRANKSHAFT WITH ORIGINAL ARRANGEMENT OF THE BALANCING OPERATION AND IMPLEMENTING DEVICE

This is a National Stage entry under 35U.S.C.§371 of Application No. PCT/FR00/02141 filed Jul. 26, 2000, and the complete disclosure of which is incorporated into this application by reference.

APPLICABLE FIELD OF THE INVENTION

This invention deals with the machining field and especially the adaptations ensuring the complete machining of a crankshaft in the best possible conditions.

DESCRIPTION OF THE INVENTION

Crankshafts are mechanical pieces having the shape of a shaft, which ensure the transmission of the alternate linear motion of the piston and connecting rod of a thermal engine to rotating motion. The pieces are classically manufactured by forging or molding before being subjected to a precise machining.

In the case of a thermal four-cylinder engine, the crankshaft is provided with four bearings, by means of which it is connected to the casing through a pivot link, four crank pins placed parallel to the rotation axis of the crankshaft and intended to drive the four connecting rods and four counterweights ensuring a balance of the masses of the crankshaft with respect to its rotation axis with the four crank pins and the eight arms that offset them from the rotation axis of the crankshaft.

Classically, the beginning of the manufacturing chain by matter removal of a crankshaft includes the following steps:

definition of the points of reference, machining of the ends, machining of the bearings, machining of the crank pins, and manufacturing of the oil holes, prior to various finishing operations as well as the final balancing through dynamic measurement and eventual equilibration through matter removal.

DESCRIPTION OF THE INVENTION

Improvements in the determination of the points of reference through centering of the crankshaft as described in the French patent 2 761 129 led the applicant to study and implement a succession of different operations in the classical machining method of a crankshaft.

Indeed, machining operations being expensive, it is essential to limit their numbers and their duration, while respecting the geometric and dynamic constraints defined by the car manufacturers.

SUMMARY OF THE INVENTION

These studies led to the concept of a new machining method allowing the optimization of the crankshaft manufacturing. According to the main feature of the invention, the machining method of the invention is remarkable in that it consists in performing the dynamic measurement and matter removal operations for balancing purposes before the finishing operations.

This feature is particularly judicious in that it ensures the balancing of the crankshaft before the operations where the unbalanced mass and the matter removal will not involve very much. Indeed, the finishing and super—finishing operations, as indicated by their names, do not remove a lot of matter and therefore do not impact in a significant manner on the unbalanced mass of the crankshaft. In all cases, matter removal on such operations can be parameterized.

This original setting of the balancing operation in the machining method of a crankshaft of the invention provides several advantages. On one hand, it allows the suppression of the equilibration process by drilling the crankshafts at the end of their achievement chain through matter removal and, on the other hand, it guarantees a dynamic measurement of the masses during an operation being relatively close to the finishing operation of the points of reference, which ensures an easier and quicker correction if said definition of the points of reference had defined surfaces of reference that would require too much matter removal in the following operations.

The operation and devices of the dynamic measurement of the masses are not new, but the performance of this operation at that moment of the achievement chain through matter removal of a crankshaft is particularly new and inventive. This change of concept in the manufacturing of a crankshaft was only possible through the recent progress made in the proper definition of the points of reference of the crankshaft to be machined.

Indeed, the concept of the methods of the prior art was to perform the measurement and the balancing of a crankshaft only when the latter had gone through all the phases of matter removal, whether machining, semi-finishing or finishing. Thus, the whole machining chain could ensure the achievement of a bad machining on a crankshaft, because of badly defined points of reference for instance, without being able to detect this faulty crankshaft before the end of the manufacturing chain, that is during the final balancing operation. Therefore, the method according to the invention remedies not only this drawback of late detection of a faulty crankshaft but it also allows for its correction.

The fundamental concepts of the invention having been described hereabove in their most elementary form, other details and features will come through more clearly by reading the following description, giving as a non restricting example an embodiment of a machining operation of a crankshaft with original setting of the balancing operation according to the invention.

DETAILED DESCRIPTION OF THE INVENTION

Figure 1:
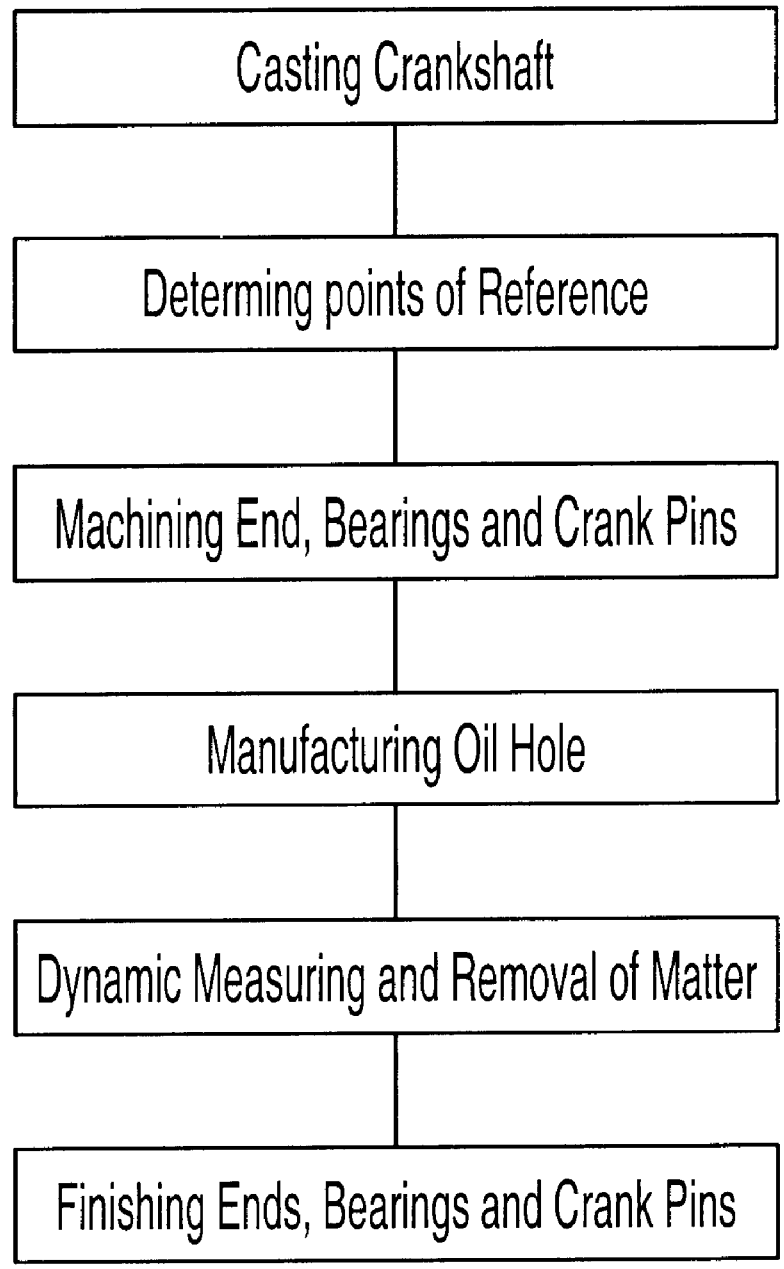
FIG. 1 is a block diagram showing a production process for the machining method for a crankshaft.

In order to better illustrate the following description, a non limiting example of the machining chain of a crankshaft is described below.

Operation 1

Manufacturing of the points of reference through geometric--and/or dynamic centering.

Operation 2

Manufacturing of the ends of the crankshaft through lathe work and/or lathe work—shaving.

Operation 3

Manufacturing of the bearings through lathe work, shaving, lathe work—shaving and/or milling—lathe work.

Operation 4

Manufacturing of the crank pins through lathe work, shaving, lathe work—shaving and/or milling—lathe work.

Operation 5
Manufacturing of the oil holes through drilling and/or boring.
Operation 6
Washing.
Operation 7
Hot tempered treatment.
Operation 8
Burnishing.
Operation 9
Finishing of the bearings.
Operation 10
Finishing of the crank pins.
Operation 11
Finishing of the fastenings of the ends through drilling, tapping, boring—milling.
Operation 12
Manufacturing of the bearings and the stop through lathe work.
Operation 13
Finishing of the plate of crankshaft.
Operation 14
Finishing of the tail of the crankshaft.
Operation 15
Achievement of the dynamic balancing through equilibration and drilling.
Operation 16
Superfinishing phase.
Operation 17
Assembly of the accessories through hot assembly.
Operation 18
Washing.
Operation 19
Final control.

In view of such a succession of operations, several ensembles of operations can be defined:
   a first ensemble called machining operations with large matter removal constituted by Operation 2 to 5,
   a second ensemble called finishing operations constituted by
Operation 9 to 14, According to a particularly advantageous feature, the method according to the invention is remarkable in that it consists in intercalating an operation of dynamic measurement of the masses of the machined crankshaft between the machining operations of the ends, bearings and crank pins of the crankshaft and that of the manufacturing of the oil holes in the crankshaft.

The achievement of a dynamic measurement at this stage of the machining chain of the crankshaft is particularly advantageous in that it is placed between the last operation of large matter removal, that is the manufacturing of the oil holes, and the one before last operation, that is the operation of the manufacturing of the crank pins. Indeed, following the operation of manufacturing of the oil holes, are the operations of washing, thermal treatment and burnishing, then those of finishing during which the matter removal is minimal or at least can be parameterized.

According to a particularly judicious feature of the invention imagined by the applicant, the machining method according to the invention consists in achieving the operation of matter removal for balancing purposes during the operation of manufacturing of the oil holes on the crankshaft. Thus, not only the method of the invention remedies the drawbacks of the methods of the prior art but it also avoids the implementation of an additional machine tool for the achievement of the equilibration. Consequently, it is not a machine as the one planed for Operation 15 that will be intercalated between the device of dynamic measurement of the masses and the manufacturing of the oil holes, but in fact only a single machine that will perform the matter removal for the manufacturing of the oil holes and the equilibration holes.

Moreover, according to a particularly judicious embodiment, the machining method of the invention is remarkable in that once the matter removal operation for balancing purposes has been performed on the crankshaft, the latter is subjected to an operation of dynamic measurement of the masses. Thus, the applicant provides for a dynamic measurement of the masses after matter removal for the purpose of machining and drilling the oil holes. This phase verifies the quality of the obtained balance. Moreover, because of the proximity in the sequence of the operations of the method of the invention, another operation of dynamic measurement of the masses, that is the one provided for after the machining operations of the bearings, the crank pins and ends of the crankshaft, and the device allowing the implementation of such a measurement can be used for the dynamic measurement of the masses as well before the operation of matter removal and oil hole drilling than afterwards.

Likewise, as it is the case with the machining chain proposed as a non restricting example, when the machining method is of the type where the definition of the points of reference is done through the drilling of the pre-machined ends of the crankshaft and that at the moment of the drilling, the crankshaft is positioned on digital supports at the level of its pre-machined surfaces, the method of the invention is remarkable in that it consists in measuring dynamically the unbalanced mass of the crankshaft after the machining operations of the bearings, crank pins and ends and in transmitting the measurements of said unbalanced mass on one hand to the matter removal device for balancing purposes in the case where the measured crankshaft can be balanced and, on the other hand, to the holding device of the crankshaft during the drilling of the points of reference in order to correct the localization of the geometric center so that the unbalanced matter of the following crankshafts at the end of the machining process can be balanced.

The use of a machine which ensures to its tool the necessary mobility for the manufacturing of the oil holes and for the equilibration operation allows the association of these two operations in a single machine in the best conditions. According to a preferred but non restricting embodiment, the machine tool constituting the device of the invention is of the type that comprises a slide mobile on three axes and provided with a tool shop.

According to a non restricting technological choice of the applicant, the slide of the machine tool is driven on its three axes by linear engines. Such a motorization will guarantee the quick achievement of the machining. The applicant also thought of using for this operation a process of a type known under its commercial name "digital way" to inform the command portion of the machine tool of the moment at which the tool touches the piece to be machined, to obtain a very precise machining run.

In order to implement the feature of the method which consists in performing an operation of dynamic measurement of the masses after the achievement of the matter removal operation for the purpose of balancing and drilling of the oil holes, the device of the invention advantageously comprises a transfer module allowing successive displacements of the crankshafts between the device of dynamic measurement of the unbalanced mass of the crankshaft and said machine tool. Said transfer module will thus provide for the possible back and forth runs that are necessary to the proper balancing of the crankshaft before the operations that follow the oil holes drilling operations. Another advantage of said transfer module is that it does not need to wait for an eventual balancing measurement or verification of the crankshaft at the end of the chain in order to detect that the unbalanced mass of the crankshaft is too important.

Moreover, said transfer module of the type that provides for the holding of the piece in the measuring device and the setting of said piece in the machining assembly of the machine tool and vice versa, can be intended to perform the punctual linkage between a machining chain of crankshafts and a machine tool of the type described hereabove that can be incorporated to another manufacturing chain. This linkage function between two machining chains is particularly appropriate when manufacturing a small series of crankshafts. Thus, not only the machining method of the crankshaft and the device allowing its implementation present the advantage that they use a single machine tool for the achievement of matter removal for balancing purposes and for the drilling of the oil holes, but they also provide for the possibility to use a machine tool located outside the machining chain of the crankshaft or at least which is not exclusively dedicated to that machining chain.

Of course, various arrangements, modifications and improvements could be made to the example described hereabove without, for that matter, going beyond the scope of the invention taken in its widest aspects and spirit. Thus for instance, in order to control the balancing quality, in some cases it could be contemplated to use an operation of dynamic measurement of the masses at the end of the machining chain and not a balancing operation through measurement and matter removal as is the case in the classical machining chains of crankshafts.

What is claimed is:

1. Machining method of a crankshaft comprising the following main operations:

determination of points of reference, machining of ends, bearings and crank pins, manufacturing of oil holes, finishing of the ends, bearings and crank pins, and dynamic measurement and eventual matter removal for balancing purposes, wherein the matter removal operation for balancing purposes is performed during the manufacturing operation of the oil holes on the crankshaft, and wherein the operations of dynamic measurement of the masses and the matter removal operations for balancing purposes are performed before the finishing operations.

2. Machining method of a crankshaft comprising the following main operations:

determination of points of reference, machining of ends, bearings and crank pins, manufacturing of oil holes, finishing of the ends, bearings and crank pins, and dynamic measurement and eventual matter removal for balancing purposes, wherein the operations of dynamic measurement of the masses and the matter removal operations for balancing purposes are performed before the finishing operations, further comprising intercalating between the machining operations of the ends, bearings and crank pins of the crankshaft and the one of manufacturing the oil holes in the crankshaft, an operation of dynamic measurement of the masses of the machined crankshaft, and where the determination of the points of reference is performed through drilling of pre-machined ends of the crankshaft and that during said drilling, the crankshaft is positioned on digital supports at the level of its pre-machined surfaces, wherein it consists in measuring dynamically the unbalanced mass of the crankshaft after the machining operation of the bearings, crank pins and ends and in transmitting the measurements of said unbalanced mass to the matter removal device for balancing purposes in the case where the measured crankshaft can be balanced and to a holding device of the crankshaft during the drilling of the points of reference in order to correct the localization of the geometric center so that the unbalanced mass of the following crankshafts at the end of the machining process can be balanced.

3. Machining method according to claim 1, wherein once the matter removal operation for balancing purposes has been performed on the crankshaft, the latter is subjected to an operation of dynamic measurement of the masses.

4. Machining method according to claim 2, the matter removal operation for balancing purposes is performed during the manufacturing operation of the oil holes on the crankshaft.

* * * * *